(12) United States Patent
Cariccia et al.

(10) Patent No.: US 12,276,328 B2
(45) Date of Patent: Apr. 15, 2025

(54) FILTERING PULLEY

(71) Applicant: DAYCO EUROPE S.R.L., Chieti (IT)

(72) Inventors: Gianluca Cariccia, Ivrea (IT); Andrea Guala, Ivrea (IT); Stefano Amadio, Ivrea (IT); Jacopo Spinelli, Ivrea (IT)

(73) Assignee: MUVIQ S.R.L., Ivera (IT)

( * ) Notice: Subject to any disclaimer, the term of this patent is extended or adjusted under 35 U.S.C. 154(b) by 0 days.

(21) Appl. No.: 18/560,504

(22) PCT Filed: May 17, 2022

(86) PCT No.: PCT/IB2022/054563
§ 371 (c)(1),
(2) Date: Nov. 13, 2023

(87) PCT Pub. No.: WO2022/243857
PCT Pub. Date: Nov. 24, 2022

(65) Prior Publication Data
US 2024/0255046 A1    Aug. 1, 2024

(30) Foreign Application Priority Data
May 17, 2021    (IT) .................. 102021000012620

(51) Int. Cl.
*F16H 55/36*    (2006.01)
*F16H 55/48*    (2006.01)

(52) U.S. Cl.
CPC ............. *F16H 55/36* (2013.01); *F16H 55/48* (2013.01); *F16H 2055/366* (2013.01)

(58) Field of Classification Search
CPC ...... F16H 55/36; F16H 2055/366; F16H 55/04
USPC ........................................................... 474/94
See application file for complete search history.

(56) References Cited

U.S. PATENT DOCUMENTS

| | | | | |
|---|---|---|---|---|
| 6,044,943 A | * | 4/2000 | Bytzek | F16D 41/20 |
| | | | | 192/55.2 |
| 6,394,248 B1 | * | 5/2002 | Monahan | F16D 41/206 |
| | | | | 192/55.61 |
| 7,591,357 B2 | * | 9/2009 | Antchak | F16F 15/12 |
| | | | | 192/81 C |

(Continued)

FOREIGN PATENT DOCUMENTS

| | | |
|---|---|---|
| DE | 102013223882 A1 | 6/2014 |
| EP | 2827014 A1 | 1/2015 |

(Continued)

OTHER PUBLICATIONS

International Search Report and Written Opinion, Application No. PCT/IB2022/054563, Jun. 28, 2022, pp. 1-14.

*Primary Examiner* — Henry Y Liu
(74) *Attorney, Agent, or Firm* — FisherBroyles, LLP; Susan M. Oiler

(57) ABSTRACT

Filtering pullies with a hub adapted to be fixed to a rotating shaft, a crown mounted coaxially and rotationally free on the hub, at least one elastic group arranged circumferentially with respect to the hub and the crown and interposed, each, between a pair of first elements integral with the hub and between a pair of second elements integral with the crown are disclosed. The pulley has a dust protection system configured to isolate the at least one elastic group with respect to the external environment and to provide an axial force generating a damping to the movement between the hub and the crown.

19 Claims, 3 Drawing Sheets

(56) References Cited

U.S. PATENT DOCUMENTS

| | | | | |
|---|---|---|---|---|
| 7,624,852 B2* | 12/2009 | Mevissen | ................ | F16H 55/36 |
| | | | | 192/55.61 |
| 7,954,613 B2* | 6/2011 | Mevissen | ................ | F16D 13/12 |
| | | | | 192/55.61 |
| 8,202,183 B2* | 6/2012 | Riu | ....................... | F16D 41/203 |
| | | | | 474/70 |
| 8,267,821 B2* | 9/2012 | Gresley | ................ | F16H 7/1218 |
| | | | | 474/133 |
| 8,632,431 B2* | 1/2014 | Pflug | ....................... | F16H 55/36 |
| | | | | 474/94 |
| 8,641,563 B2* | 2/2014 | Mende | ................ | F16F 15/1297 |
| | | | | 474/94 |
| 8,789,670 B2* | 7/2014 | Antchak | ............... | F16D 41/206 |
| | | | | 192/55.61 |
| 8,863,925 B2* | 10/2014 | Antchak | ............... | F16D 41/206 |
| | | | | 192/41 S |
| 9,528,590 B2* | 12/2016 | Mende | ................... | F16H 55/36 |
| 9,546,709 B2* | 1/2017 | Schneider | ........... | F16F 15/1442 |
| 9,682,621 B2* | 6/2017 | Dell | ........................ | F16D 3/12 |
| 9,726,253 B2* | 8/2017 | Yoon | ..................... | F16F 15/123 |
| 9,797,498 B2* | 10/2017 | Starodoubov | ........... | F16H 55/36 |
| 10,041,578 B2* | 8/2018 | Dell | ....................... | B60K 25/02 |
| 10,060,502 B2* | 8/2018 | Boyes | ............... | F16F 15/12333 |
| 10,125,856 B2* | 11/2018 | Dell | ........................ | F16D 3/66 |
| 10,267,405 B2* | 4/2019 | Dell | ....................... | B60K 25/02 |
| 10,690,228 B2* | 6/2020 | Starodoubov | ............. | F16H 7/18 |
| 11,287,024 B2* | 3/2022 | Rasch | .................... | F16H 55/36 |
| 11,585,390 B2* | 2/2023 | Cariccia | ................. | F02B 67/06 |
| 11,624,434 B2* | 4/2023 | Mora | ................... | F16F 15/1215 |
| | | | | 474/94 |
| 11,732,774 B2* | 8/2023 | Kieran | ..................... | F16H 7/20 |
| | | | | 474/94 |
| 2007/0037644 A1* | 2/2007 | Mevissen | ............... | F16F 15/123 |
| | | | | 474/70 |
| 2008/0312014 A1* | 12/2008 | Stief | .................... | F16F 15/123 |
| | | | | 474/94 |
| 2009/0305828 A1* | 12/2009 | Rasche | ................... | F16F 15/12 |
| | | | | 474/94 |
| 2010/0032258 A1* | 2/2010 | Mevissen | ................ | F16D 43/26 |
| | | | | 192/56.2 |
| 2011/0015015 A1* | 1/2011 | Gresley | ................ | F16H 7/1218 |
| | | | | 474/133 |
| 2011/0263365 A1* | 10/2011 | Mende | ................ | F16F 15/1297 |
| | | | | 474/94 |
| 2015/0260233 A1* | 9/2015 | Boyes | ............... | F16F 15/12333 |
| | | | | 474/94 |
| 2015/0316138 A1* | 11/2015 | Dell | ....................... | F16H 55/36 |
| | | | | 474/94 |
| 2015/0345610 A1* | 12/2015 | Mende | .................. | F16D 41/185 |
| | | | | 474/171 |
| 2016/0123453 A1* | 5/2016 | Starodoubov | ............ | F16H 7/18 |
| | | | | 474/94 |
| 2016/0138699 A1* | 5/2016 | Dell | ....................... | F16F 15/123 |
| | | | | 267/168 |
| 2016/0146328 A1* | 5/2016 | Dell | ....................... | B60K 25/02 |
| | | | | 474/94 |
| 2016/0153519 A1* | 6/2016 | Yoon | ........................ | F16H 7/02 |
| | | | | 474/94 |
| 2016/0201757 A1* | 7/2016 | Tran | ........................ | F02N 11/04 |
| | | | | 474/94 |
| 2020/0393033 A1* | 12/2020 | Mora | .................... | F16F 15/1215 |
| 2022/0003303 A1* | 1/2022 | Gissler | ................ | F16F 15/123 |
| 2022/0290735 A1* | 9/2022 | Hodgson | ................ | F16H 55/36 |

FOREIGN PATENT DOCUMENTS

| | | |
|---|---|---|
| WO | 2017/174070 A1 | 10/2017 |
| WO | 2018/219396 A1 | 12/2018 |

* cited by examiner

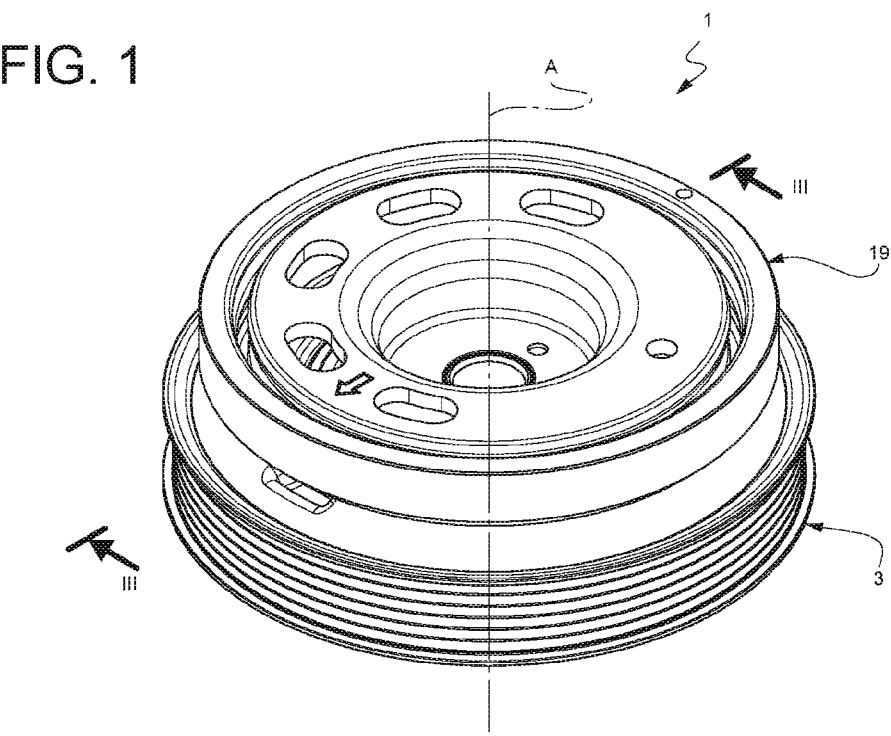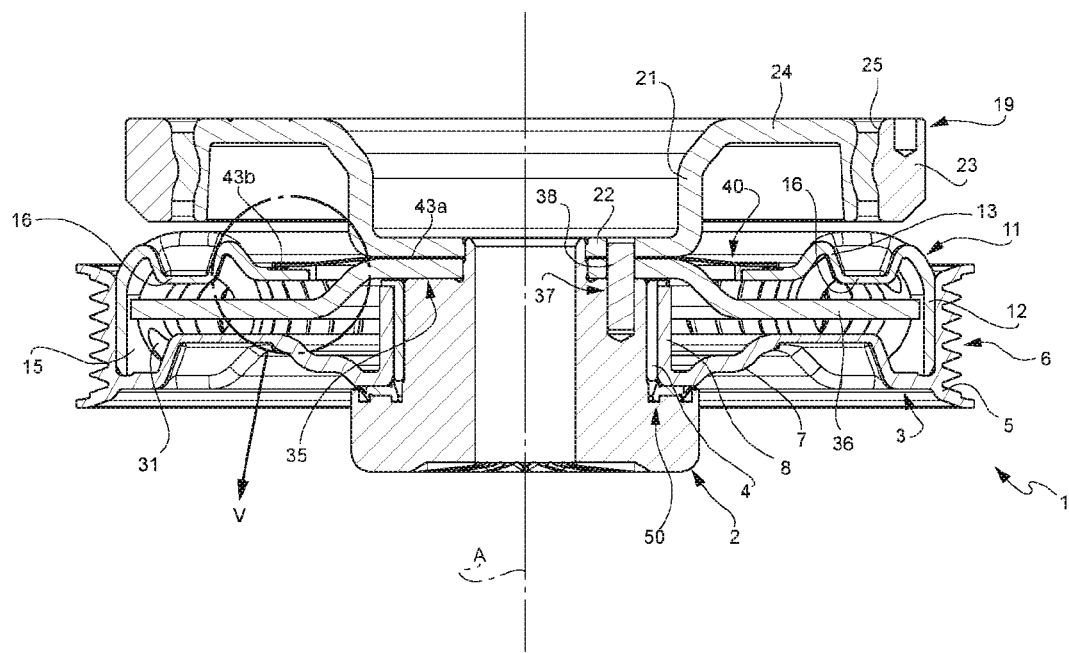

FILTERING PULLEY

CROSS-REFERENCE TO RELATED APPLICATIONS

The present invention is filed under 35 U.S.C. § 371 as the U.S. National Phase of International Patent Application No. PCT/IB2022/054563, filed May 17, 2022, which designated the United States and which claims the benefit of Italian Patent Application No. 102021000012620, filed on May 17, 2021, the entire disclosure of which is incorporated herein by reference.

TECHNICAL FIELD OF THE INVENTION

The present invention relates to a filtering pulley, preferably a pulley for a crankshaft in an accessory drive of an internal combustion engine.

STATE OF THE ART

As is known, the drive shaft in internal combustion engines is subjected to torsional vibrations due to the periodic stress caused by the combustion in the cylinders. Such vibrations are particularly intense at the start and at low speeds, as well as in the presence of particular constructional solutions such as, for example, the use of double clutch gearboxes or start-stop systems.

The torsional result vibrations in rotational irregularities of the drive pulley of the accessory drive which are transmitted to the accessories by means of the drive belt, which is thus subjected to periodic tension variations.

With the object "to filter" the torsional oscillations transmitted from the crankshaft to the belt, a filtering pulley is generally used as drive pulley, said filtering pulley being provided with a hub integral with the drive shaft, a crown cooperating with the belt and one or more elastic elements through which the torque is transmitted from the hub to the crown. An example of such filtering pulley is illustrated in WO2016/151455 A1.

In the pulleys of known type, it is known that dust and dirt can enter the space housing the filtering elements causing noises and possible dysfunctionalities. In this manner the useful life of the filtering pulley is reduced.

The object of the present invention is to manufacture a filtering pulley which solves the aforementioned technical problem in a simple and cost-effective manner.

SUBJECT AND SUMMARY OF THE INVENTION

The aforementioned object is achieved by a filtering pulley according to what claimed in the appended claims.

BRIEF DESCRIPTION OF THE DRAWINGS

In order to better understand the present invention, a preferred embodiment is described in the following, by way of non-limiting example and with reference to the accompanying drawings, wherein:

FIG. 1 is a perspective view of a filtering pulley according to the invention;

FIG. 3 is a sectional view according to line III-III of the pulley of FIG. 1;

DETAILED DESCRIPTION OF PREFERRED EMBODIMENTS OF THE INVENTION

Figure 2:
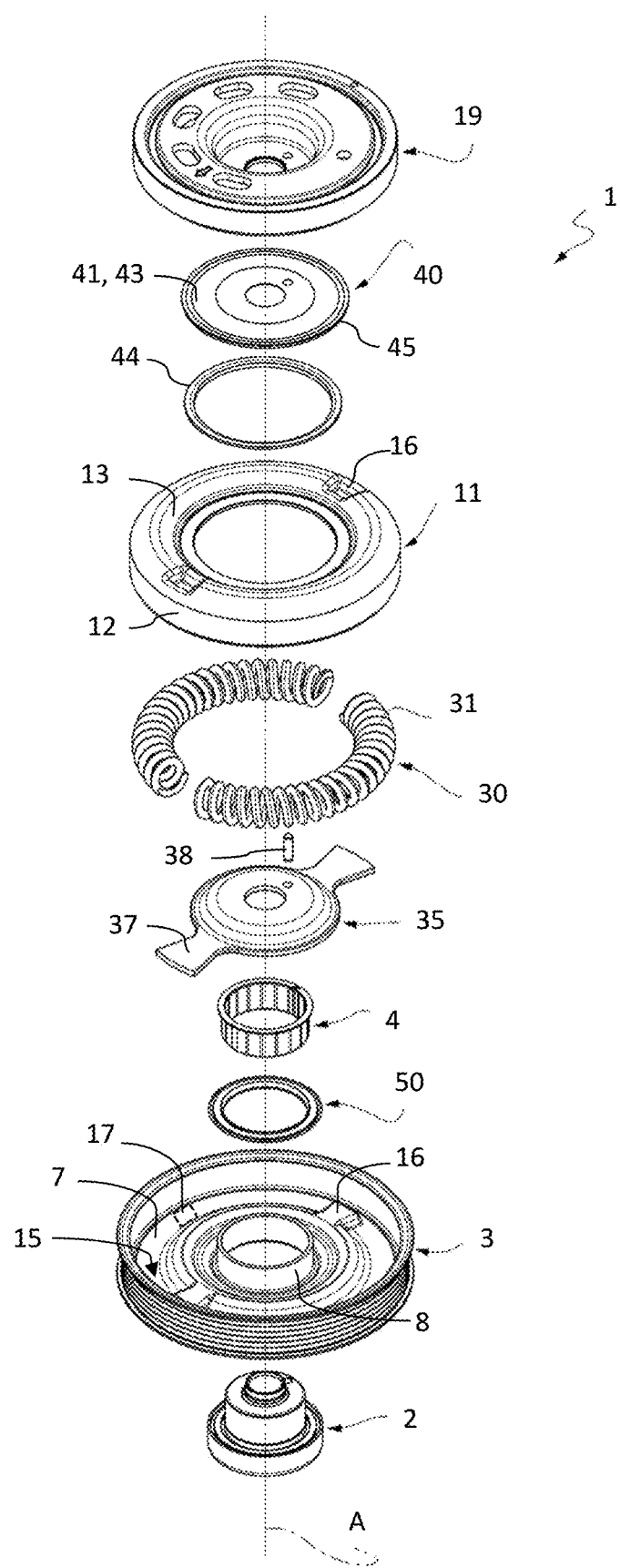
FIG. 2 is an exploded view of the pulley of FIG. 1.
Figure 4:
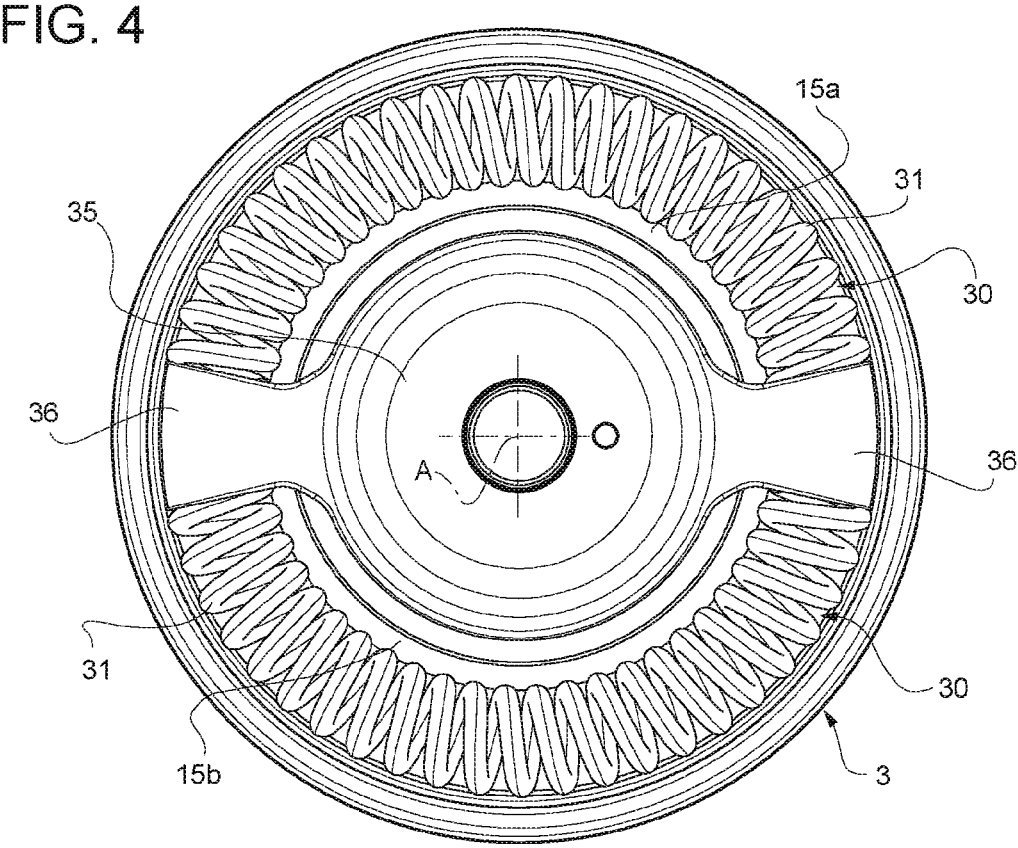
FIG. 4 is a top view of the pulley of FIG. 1 with parts removed for clarity.
Figure 5:
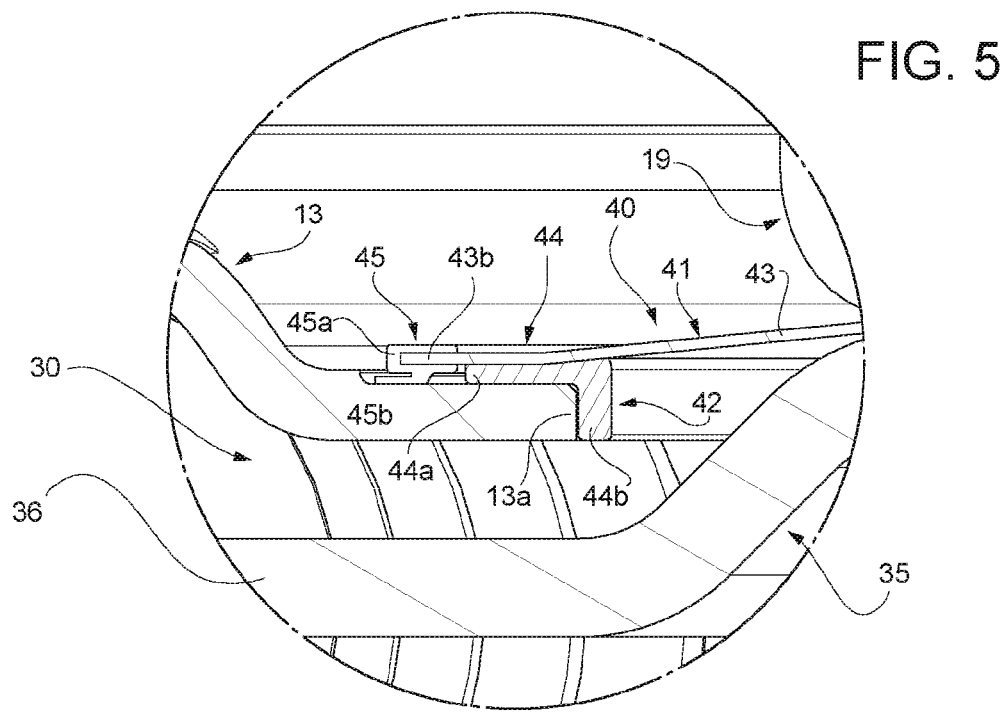
FIG. 5 is an enlarged view of a portion of FIG. 3.

In the accompanying figures, a filtering pulley 1 is represented comprising a hub 2 of axis A, adapted to be connected to a shaft (not represented), for example a crankshaft of an internal combustion engine, and an annular crown 3 externally coaxial to the hub 2 and supported in a rotationally free manner on the hub 2 by means of a supporting element 4, such as a bush.

The crown 3 comprises an annular portion 5 provided with a profile 6 adapted to cooperate with a poly-V belt (not represented). The crown 3 further comprises a radial wall 7, integral with the annular portion 5 and preferably of a single piece therewith, extending radially towards the hub 2, and a substantially cylindrical internal wall 8 of axis A.

The crown 3 carries, integral thereto, a closing element 11 comprising an outer cylindrical wall 12 of axis A, a flat radial annular wall 13. The closing element 11 is driven into the crown 3 so as to form an annular chamber 15 radially comprised between the wall 12 and the wall 8 and axially delimited by the wall 7 and the wall 13.

The closing element 11 finally comprises two diametrically opposite projections 16 axially extending inside the chamber 15 starting from the wall 13 (see FIG. 3). The projections 16 divide the chamber 15 into two portions 15a, 15b, preferably of equal dimensions.

On the wall 7 stop elements are provided, such as further two projections 17 preferably arranged at 180° with respect to the projections 16, thus substantially in the middle of the respective aforementioned portions 15a, 15b of the chamber 15. The projections 16 or the aforementioned stop elements 17 are carried fixed by the respective walls or, alternatively, made of a single piece with the same.

The pulley 1 can further be provided with a dynamic damper 19 comprising a disc 21, facing the closing element 11 and having a portion of hub 22 integral with the hub 2, and a seismic ring 23 constrained to a peripheral flange 24 of the disc 21 by a ring 25 of elastomeric material.

As is illustrated, the pulley 1 further comprises at least one elastic group 30, for example two elastic groups 30 arched and arranged circumferentially free in the respective portions 15a, 15b of the chamber 15 delimited by the projections 16.

Each of the elastic groups 30 comprises at least one spring, in the described case a helical and arched spring 31 mounted between the aforementioned projections 16.

The pulley 1 further comprises an actuator 35 carried integrally by the hub 2 and advantageously axially interposed between the hub 2 and the disc 21 of the dynamic damper 19. The actuator 35 has two spokes 36 free to move circumferentially in the chamber 15 and adapted to interact with the elastic groups 30 by contact as described in the following.

Advantageously, the actuator 35 is carried by the hub 2 by means of a shape coupling 37, for example by means of a pin 38 configured to be inserted in respective openings of the actuator 35 and of the hub 2. Preferably, the shape coupling 37 allows the coupling also of the disc 21 of the dynamic damper 19 to the hub 2, hence it comprises an opening adapted to the insertion of the pin 38.

The actuator 35 can be placed in contact with the elastic groups 30, possibly with a circumferential interference value so as to preload the elastic groups 30 inside the seat 15. Alternatively, it can be placed with an angular interval with respect to the elastic groups 30, i.e. an angular play before entering into contact with the same.

The pulley 1 can also further comprise a dust protection lip 50 configured to prevent the contamination from the outside of the rotating support 4 between hub 2 and crown 3. Such dust protection lip 50 is placed axially between hub 2 and crown 3, facing the rotating support 4 on an internal radial side and open towards the outer radial side.

According to the invention, the pulley 1 comprises a dust protection system 40 configured to isolate the space 15 from the outside and extending between the wall 13 of the element 11 and the hub 2 and on the other hand generate an axial force, i.e. along the axis A on the wall 13, adapted to generate a damping between hub 2 and pulley 3.

In particular, the dust protection system 40 comprises an elastic element 41 configured to give an axial compression force along the axis A and a sealing element 42 configured to be placed in contact with the wall 13.

More specifically, the wall 13, as mentioned, extends towards the hub 2 without any contact therewith and thus defines an internal annular edge 13a on which the sealing element 42 cooperates.

In particular, the elastic element 41 can comprise a leaf spring 43, advantageously of the conical cup type or Belleville type spring, carried by the actuator 35.

In particular, the spring 43 defines an internal end 43a and an outer end 43b, where the outer end 43b is the one cooperating with the sealing element 42 for providing the compressive force thereto along the axis A.

The internal end 43a is rigidly carried by the actuator 35 and, in the described case, is advantageously pinched by friction between the actuator 35 and the dynamic damper 19.

Advantageously, the sealing element 42 can comprise a first sealing element 44 and a second sealing element 45. Clearly, a further third and a further fourth sealing element can be provided, according to the sealing needs of the element 42.

In particular, the first sealing element 44 has an L-shaped section comprising an annular portion 44b facing the internal radial end of the internal annular edge 13a and a radial portion 44a, connected to the annular portion 44b and preferably coupled thereto. In particular, the radial portion 44a is placed on a face of the internal annular edge 13a on the opposite side of the elastic groups 30.

Specifically, the second sealing element 45 is placed radially external with respect to the first sealing element 44 and is configured to cooperate with an outer radial edge of the outer end of the spring 43 and comprises a main body 45a cooperating with such edge and a lip 45b, carried by the main body 45a and cooperating in contact with the wall 13.

Advantageously, the sealing element 42 is made of polymeric material and co-molded on the elastic element 41. In particular, at least one between the first and the second sealing elements 44, 45 is co-molded with respect to the spring 43, advantageously at least the second sealing element 45 is co-molded on the spring 43.

More preferably, the first sealing element 44 is made of plastic, of a material and with a width such to support the axial loads more than the second sealing element 45. The latter is preferably made of rubber, and has the function of sliding sealing.

The operation of the pulley 1 is described in the following.

In a first operational step, called driving mode and constituting the normal operation of the pulley 1, when the drive shaft pulls the accessories, the speed of the hub 2 tends to exceed the speed of the crown 3. For this reason, the spokes 36 of the actuator 35 transmit the torque to the projections 16 with the interposition of the respective elastic groups 30.

What described above occurs, symmetrically, in the overrunning condition, i.e. when the speed of the crown 3 tends to exceed the speed of the hub 2.

Depending on the damping present between the hub 2 and the crown 3, as known per se, a hysteresis can be present with respect to the two operations described above. In case of important angular variations which could damage the elastic groups 30, the stop elements prevent excessive relative rotation between hub 2 and crown 3.

The actuator 35 if in contact preloaded by or distanced from the elastic groups, allows an angular play between hub 2 and crown 3.

During the movement of the actuator 35, the dust protection system 40 is pulled in its rotation around the axis A and slides with respect to the wall 13. During such sliding, it simultaneously has the function of preventing the dirt from entering inside the space 15 or the lubricant from exiting it and, thanks to the axial force given, of providing a suitable damping between hub 2 and crown 3.

The advantages of a pulley 1 according to the invention are thus evident.

Thanks to the dust protection system proposed, it is possible to maintain uncontaminated the space where the actuator and the elastic groups slide.

Additionally, it is simultaneously possible to provide a suitable damping to the movement between hub and crown.

Still, the presence of a cup spring allows easily adjusting the damping value providable, making the driving feature of the pulley easily adjustable depending on the vehicular needs.

The fact that the sealing element is co-molded on the spring allows reducing the complexity of the assembling, thus reducing the manufacturing time making the manufacturing of the pulley 1 more cost-effective.

Furthermore, thanks to the co-molding, the introduction of dirt elements inside the space 15 is reduced. Still, such introduction is even more reduced by the presence of two sealing elements 44, 45.

Finally, it is clear that modifications or variations can be made to the described pulley which do not depart from the scope of protection defined by the claims.

First of all, the pulley could be used not exclusively on the crankshaft of an internal combustion engine but for one of the accessories of the same.

With reference to the elastic group 30, they could be manufactured without anyway modifying their function. For example, they could comprise springs of different nature or several springs, in series or in parallel. Still, the elastic groups could be four and likewise the spokes of the actuator.

The dynamic damper 19 could be absent and the actuator could be carried differently by the hub 2. Likewise, the bush could be replaced by roller bearings.

Still, the sealing element 42 or the spring 43 could be replaced by devices having the same function.

The invention claimed is:

1. Filtering pulley comprising:
   a hub adapted to be fixed to a shaft rotating around an axis (A),
   a crown mounted coaxially and rotationally free on said hub, the crown comprising a closing element;
   at least one elastic group arranged circumferentially with respect to said hub and said crown, and interposed, each, between a pair of first elements of an actuator integral with said hub and between a pair of second elements integral with said crown, a dynamic damper, and a dust protection system configured to isolate said at least one elastic group with respect to the external environment and to provide an axial force generating a damping to the movement between said hub and said crown, wherein said dust protection system comprises:

a sealing element in contact with the covering element of the crown; and an elastic element comprising a first end pinched between the dynamic damper and the actuator of said hub and a second end cooperating with said sealing element and biased into engagement with the covering element of the crown.

2. The filtering pulley according to claim 1, wherein said elastic element is a cup spring.

3. The filtering pulley according to claim 1, wherein said sealing element comprises a first sealing element and a second sealing element separated from each other and both in direct contact with said closing element of said crown.

4. The filtering pulley according to claim 3, wherein said first sealing element has an L-shaped section cooperating in contact with an internal radial edge of said element.

5. The filtering pulley according to claim 4, wherein said second sealing element comprises a main body carried by an outer edge of said second end of said elastic element and a lip carried by said main body and cooperating in contact with said closing element.

6. The filtering pulley according to claim 3, wherein said second sealing element is placed in a radially external position juxtaposed to said first sealing element.

7. The filtering pulley according to claim 1, wherein said sealing element is made of polymeric material.

8. A filtering pulley comprising:

a hub adapted to be fixed to a shaft rotating around an axis (A), a crown mounted coaxially and rotationally free on the hub, at least one elastic group arranged circumferentially with respect to the hub and the crown, and interposed, each, between a pair of first elements integral with the hub and between a pair of second elements integral with the crown, a dust protection system comprising an elastic element and a sealing element, the elastic element having a first end connected to the hub and a second end cooperating with the sealing element, and the sealing element cooperating in contact with the pair of second elements integral with the crown, wherein the dust protection system is configured to isolate the at least one elastic group with respect to the external environment and to provide an axial force generating damping to the movement between the hub and the crown;

wherein the sealing element comprises a first sealing element made of plastic and a second sealing element made of rubber.

9. The filtering pulley according to claim 1, wherein said sealing element is co-molded on said elastic element.

10. The filtering pulley according to claim 1, wherein said first elements comprise at least two spokes carried by an actuator integral with the hub, said dust protection system being carried by said hub.

11. The filtering pulley according to claim 10, wherein said actuator is carried by said hub by means of a shape coupling.

12. The filtering pulley according to claim 1, wherein said second elements are projections integral with an element of said crown.

13. The filtering pulley according to claim 12, wherein said at least one elastic group is circumferentially sliding inside a seat formed between said first elements and/or said second elements.

14. The filtering pulley according to claim 1, characterized in that it comprises a dynamic damper.

15. The filtering pulley according to claim 1, characterized in that it comprises stop elements carried solidly by one said crown configured to prevent excessive angular rotation between said hub and said crown.

16. The filtering pulley according to claim 8, wherein the plastic is a polymeric material.

17. The filtering pulley according to claim 1, wherein said elastic element is an annular leaf spring.

18. The filtering pulley according to claim 1, wherein the first sealing element is configured to support an axial load more than the second sealing element.

19. The filtering pulley according to claim 18, wherein the second sealing element is configured for sliding sealing.

* * * * *